United States Patent
Nelson et al.

(10) Patent No.: US 8,003,154 B2
(45) Date of Patent: Aug. 23, 2011

(54) HYDRATION PROCESS FOR A REFRIED BEAN PRODUCT

(75) Inventors: James S. Nelson, Cokato, MN (US); Judene Smahel, Hutchinson, MN (US)

(73) Assignee: Fairbault Foods, Inc., Minneapolis, MN (US)

( * ) Notice: Subject to any disclaimer, the term of this patent is extended or adjusted under 35 U.S.C. 154(b) by 1209 days.

(21) Appl. No.: 11/623,971

(22) Filed: Jan. 17, 2007

(65) Prior Publication Data

US 2008/0171126 A1    Jul. 17, 2008

(51) Int. Cl.
    *A23L 1/20*    (2006.01)
(52) U.S. Cl. ........ 426/634; 426/518; 426/519; 426/509; 426/507
(58) Field of Classification Search .......... 426/634, 426/518, 519, 509, 507
    See application file for complete search history.

(56) References Cited

U.S. PATENT DOCUMENTS

| | | | |
|---|---|---|---|
| 2,896,676 A * | 7/1959 | Minard ........... | 141/146 |
| 4,259,051 A | 3/1981 | Shatila | |
| 4,407,840 A * | 10/1983 | Lathrop et al. ........ | 426/629 |
| 4,676,990 A | 6/1987 | Huffman et al. | |
| 4,729,901 A | 3/1988 | Rockland et al. | |
| 4,735,816 A * | 4/1988 | Sterner et al. ........ | 426/457 |
| 4,889,734 A | 12/1989 | Shatila | |
| 4,900,578 A | 2/1990 | Bakker et al. | |
| 5,296,253 A | 3/1994 | Lusas et al. | |
| 5,545,425 A | 8/1996 | Wu | |
| 5,614,245 A * | 3/1997 | Gupta et al. ........ | 426/602 |
| 5,725,902 A | 3/1998 | Lesueur-Brymer et al. | |
| 5,744,188 A | 4/1998 | Kolla et al. | |
| 5,863,591 A | 1/1999 | Seguin | |
| 5,980,971 A * | 11/1999 | Walsh ........... | 426/634 |
| 6,183,797 B1 | 2/2001 | Dull | |
| 6,602,539 B2 | 8/2003 | Stubbs et al. | |
| 7,022,369 B1 | 4/2006 | Kleinman | |
| 7,029,716 B2 * | 4/2006 | Margolis ........ | 426/459 |
| 7,413,762 B1 * | 8/2008 | Camin et al. ........ | 426/634 |
| 2006/0251788 A1 * | 11/2006 | Angel ........... | 426/549 |

* cited by examiner

*Primary Examiner* — Anthony Weier
(74) *Attorney, Agent, or Firm* — Faegre & Benson LLP

(57) ABSTRACT

This application provides a process for producing a refried bean product. The refried bean product contains both homogenized cooked bean particles and larger sized cooked bean particles and provides a texture typical of refried beans. The present process includes hydrating dried beans in water a period of time sufficient to increase the moisture content of the beans, cooking the hydrated beans in water, coarse grinding the cooked beans to provide a bean slurry, dividing the bean slurry into first and second portions, milling the first bean portion to provide a milled bean portion, homogenizing the milled bean portion with water to provide an homogenized bean portion, combining the homogenized portion and the second coarse ground bean portion with water, spices and lard to provide a combined bean mixture, and mixing the combined bean mixture to provide a refried bean product.

8 Claims, No Drawings

HYDRATION PROCESS FOR A REFRIED BEAN PRODUCT

BACKGROUND

This invention relates to the production of a refried bean product having excellent and uniform quality. More particularly the invention relates to a hydration process for producing a refried bean product having the characteristic flavor, texture and color of conventional refried beans.

Canned refried beans are enjoying increasing popularity as adjuncts to Mexican-style foods, particularly as a replacement to "homemade" refried beans. Canned refried are easier and faster to prepare compared to refried beans that are made from scratch.

It is difficult, however, to maintain the consistency of desirable characteristics of a canned refried bean product from day to day. Moreover, the characteristics of a refried bean product prepared from one lot of beans may vary considerably from those of a refried bean product prepared from another lot of beans. Such lack of uniformity of a canned product characteristics is particularly disadvantageous because the consumer expects the canned product to be consistent from one can to another. In order to compensate for these types of problems, manufactures have had to err on the side of increasing dry matter in the canned product which is very detrimental to overall cost of the product.

SUMMARY OF THE INVENTION

The present invention provides a process in which dried beans are processed into a refried bean product having the characteristic flavor, texture and color of conventional refried beans, including the presence of particulate bean material. In an embodiment of this invention, hydrated uncooked beans are cooked, in the presence of water, for a period of time sufficient to make them digestible and impart a desired cooked bean flavor and color characteristics to the cooked beans. After being cooked, the beans are coarsely ground to form a bean slurry containing finely divided bean mash, whole bean pieces, and bean skin particles. The bean slurry is then divided into two portions, a first and a second coarse ground bean portion. Water is added to the first coarse ground bean portion which is milled and then homogenized to provide a homogenized bean portion. This homogenized bean portion and the second coarse ground bean portion are combined with water, spices and lard and then finally mixed to give the refried bean product. The use of this process allows an increase in the moisture content and provides a more consistent refried bean product compared to conventional processes. Moisture contents of the refried bean products prepared by the present process may be more than 80%.

DETAILED DESCRIPTION

In accordance with the present invention, raw dried beans, either whole or split, are first cleaned and washed by any suitable means to remove impurities. Beans that may be used in this invention include beans such as pinto, pink, red, black and the like. The raw dried beans, which may typically have a moisture content of between 5-15%, are hydrated to a significantly higher moisture content prior to cooking in order to reduce the period of time required to cook the beans. Accordingly, the moisture content of the raw dried beans is increased, before cooking, by rehydrating the beans in any suitable manner in water. In one embodiment, the dried beans are contacted with sufficient water to increase their moisture content to about 55%.

After hydration, the beans, together with a sufficient amount of water, are introduced into a cooker in which the beans are cooked under appropriate time and temperature conditions sufficient to make the beans digestible and impart a cooked bean flavor and color to the mixture. In one embodiment of the invention, a mixture of hydrated beans and water are cooked at a temperature of about 200° F. for about 15 minutes.

The beans may be cooked in a batch wise process or in a continuous process. In a typical batch system, the beans and water are added to a steam jacketed scrape surface kettle. The beans and water are generally heated to a minimum of 200° F. and then held at this temperature for about 15 minutes. A typical mixture would be made up of about 60% hydrated beans and about 40% water.

Upon completion of cooking, the cooked beans are coarsely ground to produce a bean slurry. The coarse grinding may be accomplished in the same kettle as cooking using a suitable high shear mixer such as, for example, an ADMIX ROTO-STAT mixer. The time of the high shear agitation may be adjusted to provide the desired consistency of the coarse ground material. In general, the high shear agitation time should be long enough to provide enough starch release to allow particulates to stay in suspension. The resulting bean slurry contains finely divided bean mash, larger whole bean pieces and particles of bean skin. The bean slurry is then separated into two portions, a first and a second portion.

In accordance with the present invention, the first portion of the bean slurry is milled. A number of different mills may be used to finely grind the coarse ground bean mixture. For example, an Urschel COMITROL mill with a 0.030 inch head may be used to finely grind or mill the coarse ground material.

After being milled, water is added and mixed with the milled material. This water addition and mixing can be done in a steam jacketed scrape surface kettle. A typical mixture includes about 75% milled material or slurry and about 25% water. The temperature of the mixture is generally maintained at approximately 190° F. This mixture is typically then "stuffed" pumped into a homogenizer. A typical homogenizer pressure setting would be about 3,000 psi with either a single stage or two stage homogenizer being used. Some variations are acceptable in order to adjust or optimize the pressure setting but pressure settings of less then 2,000 psi seem to be ineffective. Typically the homogenized mixture or puree is stored in a "make-up" kettle, to be used as needed, at a temperature maintained at about 190° F.-200° F.

Next, the homogenized bean portion together with the coarse ground bean portion are combined with water, flavoring, seasonings or spices. In general, the homogenized portion and the coarse ground portion are metered or weighed into a mixing vessel. A typical mixture would be 40% homogenized bean portion, 40% coarse ground bean portion, 18% water and 2% flavorings/particulate flavoring materials/seasonings/spices/lard/etc. One form of mixing vessel, for example, is a dual motion scrape surface steam jacketed kettle. Sufficient mixing should be allowed to insure a uniform mixture and the mixture is then heated to approximately 195° F. before filling.

Flavorings such as animal or vegetable fat or oil, including tallow, lard, beef fat, soybean oil and the like; seasonings including salt, onion powder, particulate materials including chopped or diced chilis, jalopena peppers and the like; or a variety of other spices and flavorings may be incorporated, if desired, to give the product a desired flavor may also be added to this kettle. According to various embodiments, animal or vegetable fat or oil, in an amount of about 0.2-0.5% by weight, seasoning, in an amount of about 1-2% by weight, and particulate flavoring by materials in an amount of about 3-8% by weight are added, with mixing, to the homogenized and coarse ground bean portions.

The refried bean product produced by the present process contains a major proportion of finely divided cooked bean particles together with an appreciable quantity of cooked bean skin particulate, with the bean skin particulate being substantially larger in size than the bean particles. The presence of such bean skin particulate provides the product with a texture characteristic of conventional refried beans.

The present invention is further illustrated by the following example.

EXAMPLE 1

A refried bean product was produced by the following procedure.

Dry beans were hydro pumped and dewatered into a continuous hot water rotary screw blancher. Beans were blanched for 45 minutes at 180° F. to provide re-hydrated beans with a moisture content of 55%. The re-hydrated beans were then flumed across a de-stoner and hydro pumped to steam jacketed scrape surface slurry batch tanks. In these batch tanks 2,400 lbs of 190° F. water was first added and then 3,400 lbs of re-hydrated beans were added. As soon as the beans were starting to be added to the batch tanks, the steam on the kettle was turned on to begin heating and the scrape surface agitator was turned on. After the beans were added the heating continued until a temperature of 200° F. was reached. Once this temperature is achieved, the mixture was heated for 15 minutes. After the hold time, a ADMIX ROTO-STAT mixer was turned on for 1 minute and 45 seconds. Following the mixing step, one-half of the mixture was pumped to a coarse ground storage tank to be used in batching while the other half was pumped through an Urschel COMITROL mill with a 0.030" head that milled the mixture which was then placed into a puree storage kettle. The total amount of the mixture added to the puree storage kettle was 2,900 lbs which was then combined with 1,000 lbs of 190° F. water. This mixture was then mixed in the kettle for 5 minutes using the scrape surface agitator. This material was then pumped at a rate of 10 gpm and 40 psi into a two stage Gaulin homogenizer. The second stage of the homogenizer was set at 600 psi with the first stage being set at 3,000 psi. After passing through the homogenizer, 1,400 lbs of this material was pumped into a dual motion scrape surface steam jacketed mix kettle. In addition to the homogenized puree, 1,400 of coarse ground slurry, 635 lbs of water, 15 lbs of lard and 50 lbs of seasoning were also added to the kettle. The combined materials were mixed and heated to 200° F., which took approximately 2 minutes. This combined product was then sent to a storage kettle where it was pumped to a filler, filled in cans and thermally processed. The resultant product had the desired consistency, flavor and particulate attributes expected from canned refried beans.

A sample of the combined product, before filling, was taken, finely ground and measured in a microwave moisture analyzer. The resultant moisture content was found to be 80.5%.

The foregoing embodiments of the invention have been given for illustrative purposes only and no unnecessary limitations should be understood therefrom, for various modifications will be apparent to those familiar with this art. The scope of this invention is defined in the appended claims.

What is claimed is:

1. A process for producing a refried bean product comprising the steps of:
   (a) hydrating dried beans in water for a period of time sufficient to increase the moisture content of the beans to approximately 55% to provide hydrated beans,
   (b) cooking the hydrated beans in water for about 15 minutes at 200° F. to provide cooked beans having a cooked bean flavor and color,
   (c) coarse grinding the cooked beans to provide a bean slurry including finely divided bean mash, whole bean pieces and bean skin particles,
   (d) dividing the bean slurry into first and second coarse ground bean portions,
   (e) milling the first coarse ground bean portion to provide a milled bean portion,
   (f) homogenizing the milled bean portion with water to provide a homogenized bean portion,
   (g) combining the homogenized bean portion and second coarse ground bean portion with water, seasonings and lard to provide a combined bean mixture, and
   (h) mixing the combined bean mixture to provide a refried bean product.

2. The process of claim 1 where the dried beans are hydrated either in a continuous blancher at 180° F. for about 45 minutes or in a soaking processor at 120° F. for about 4 hours.

3. The process of claim 1, wherein the bean slurry contains a suspension of particulates.

4. The process of claim 1, wherein the first coarse ground bean portion is milled to about 0.030 inches.

5. The process of claim 1, where in the milled bean portion is homogenized at a pressure setting of about 3,000 psi.

6. The process of claim 1, wherein the refried bean product comprises about 40% coarse ground bean portion, about 40% homogenized bean portion, about 18% water, about 0.5% lard and about 1.5% seasonings.

7. The process of claim 1, wherein the combined bean mixture is mixed until uniform and heated at a temperature in the range of 175° F.-195° F. before filling.

8. The process of claim 1, further comprising the step of filling the refried bean product into cans or pouches with a piston filler.

* * * * *